United States Patent
Light et al.

(10) Patent No.: US 11,516,334 B2
(45) Date of Patent: Nov. 29, 2022

(54) COMMUNICATION DEVICE WITH AUTOMATED REMINDERS AND METHODS FOR USE THEREWITH

(71) Applicant: STLIKE LLC, Dallas, TX (US)

(72) Inventors: Adam Michael Light, New York, NY (US); Bruce E. Stuckman, Austin, TX (US); Robert M. Kennard, Dallas, TX (US)

(73) Assignee: STLIKE LLC, Dallas, TX (US)

( * ) Notice: Subject to any disclaimer, the term of this patent is extended or adjusted under 35 U.S.C. 154(b) by 0 days.

(21) Appl. No.: 16/983,872

(22) Filed: Aug. 3, 2020

(65) Prior Publication Data
US 2022/0038571 A1 Feb. 3, 2022

(51) Int. Cl.
*H04M 1/72436* (2021.01)
*G06F 3/0482* (2013.01)

(52) U.S. Cl.
CPC ...... *H04M 1/72436* (2021.01); *G06F 3/0482* (2013.01)

(58) Field of Classification Search
CPC ............. H04M 1/72436; G06F 3/0482; G06Q 10/06311
See application file for complete search history.

(56) References Cited

U.S. PATENT DOCUMENTS 7,385,875 B2 6/2008 May
9,531,862 B1 * 12/2016 Vadodaria ............... H04L 51/02
2003/0087665 A1 * 5/2003 Tokkonen ......... H04M 1/72454 455/556.1
2007/0004383 A1 1/2007 Agozo
2008/0207173 A1 * 8/2008 Jendbro ............ H04M 1/72451 455/412.1
2012/0293341 A1 11/2012 Lin
2013/0040668 A1 * 2/2013 Henn ................. H04M 1/27453 455/466
2014/0033071 A1 * 1/2014 Gruber ............... G06Q 10/1097 715/752
2015/0006632 A1 * 1/2015 Tomkins ................. H04L 51/20 709/204
2015/0207926 A1 * 7/2015 Brown .............. H04M 1/72436 455/414.1

(Continued)

FOREIGN PATENT DOCUMENTS

EP 16143051 A 1/2006
EP 17176872 A 11/2006

(Continued)

*Primary Examiner* — Roberto Borja
(74) *Attorney, Agent, or Firm* — Garlick & Markison; Bruce E. Stuckman

(57) ABSTRACT

A mobile communication device operates by: generating an interactive interface that is presented for display via a display device associated with the mobile communication device; receiving reminder data via user interaction with the interactive interface, wherein the reminder data indicates a reminder associated with one of a plurality of contacts; receiving communication event data in response to a communications event associated a communication, via the mobile communication device, with the one of the plurality of contacts; generating, in response to the communication event, a notification that includes the reminder data; and presenting the notification for display via the interactive interface.

16 Claims, 13 Drawing Sheets

(56) References Cited

U.S. PATENT DOCUMENTS

| | | | |
|---|---|---|---|
| 2017/0250931 A1* | 8/2017 | Ioannou | H04L 67/18 |
| 2017/0277396 A1* | 9/2017 | Chung | G06F 3/0482 |
| 2019/0129615 A1* | 5/2019 | Sundar | G06F 9/451 |

FOREIGN PATENT DOCUMENTS

| | | | |
|---|---|---|---|
| EP | 17283861 | A | 12/2006 |
| EP | 17399371 | A | 1/2007 |
| EP | 17570812 | A | 2/2007 |
| EP | 18078161 | A | 7/2007 |
| EP | 18342652 | A | 9/2007 |
| WO | 20010677042 | W | 9/2001 |
| WO | 2004093475 | A1 | 10/2004 |
| WO | 2005094068 | A1 | 10/2005 |
| WO | 2005117410 | A2 | 12/2005 |
| WO | 2006050295 | A1 | 5/2006 |
| WO | 2006069778 | A2 | 7/2006 |
| WO | 20070212021 | W | 2/2007 |

\* cited by examiner

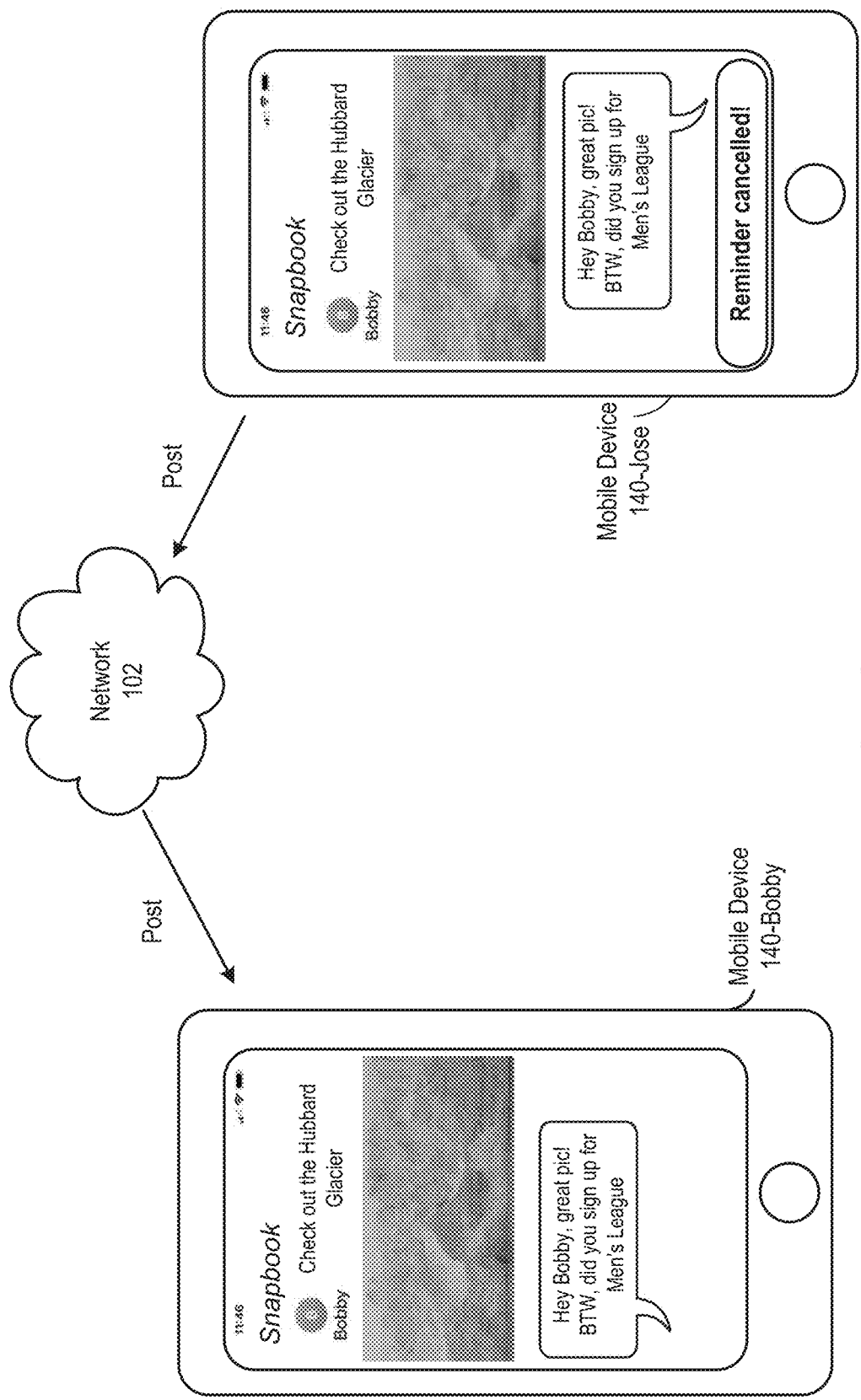

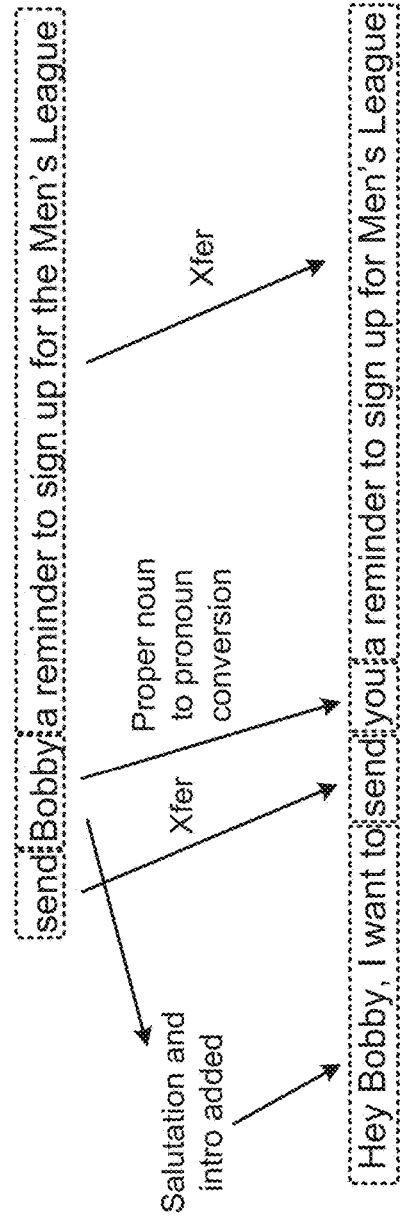
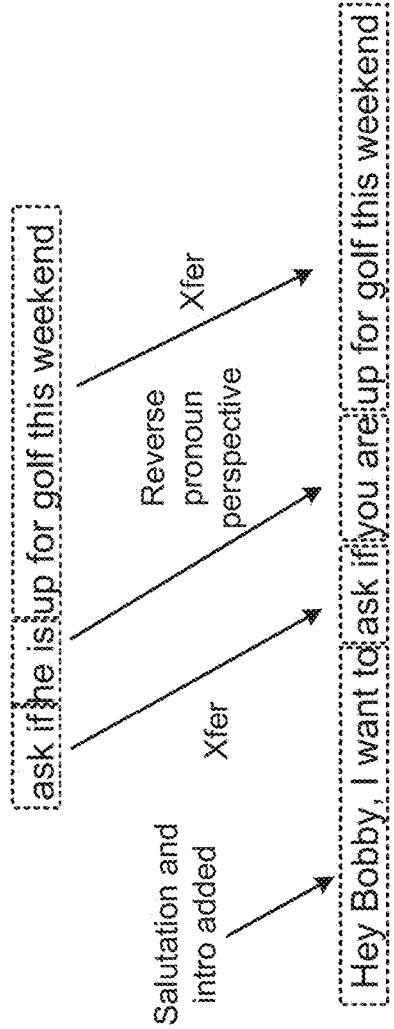

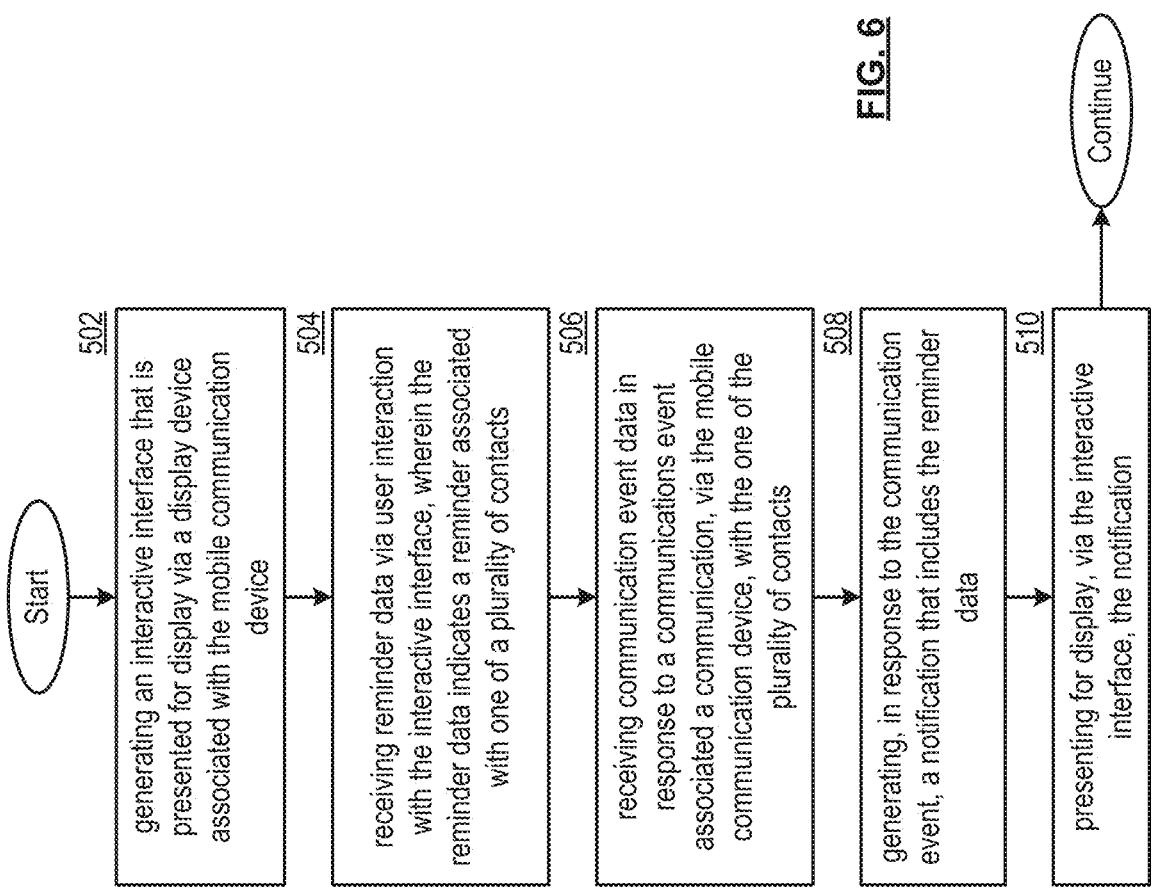

COMMUNICATION DEVICE WITH AUTOMATED REMINDERS AND METHODS FOR USE THEREWITH

CROSS-REFERENCE TO RELATED APPLICATIONS

None.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to communication devices, such as mobile devices that communicate via a communication network.

BRIEF SUMMARY OF DRAWINGS

FIGS. 4A-4G illustrate screen displays of mobile communication devices in accordance with various embodiments;

FIGS. 5A and 5B illustrate reminder data to message conversion in accordance with various embodiments; and FIG. 6 is a flowchart representation of a method in accordance with various embodiments.

DETAILED DESCRIPTION OF THE INVENTION

Figure 1:
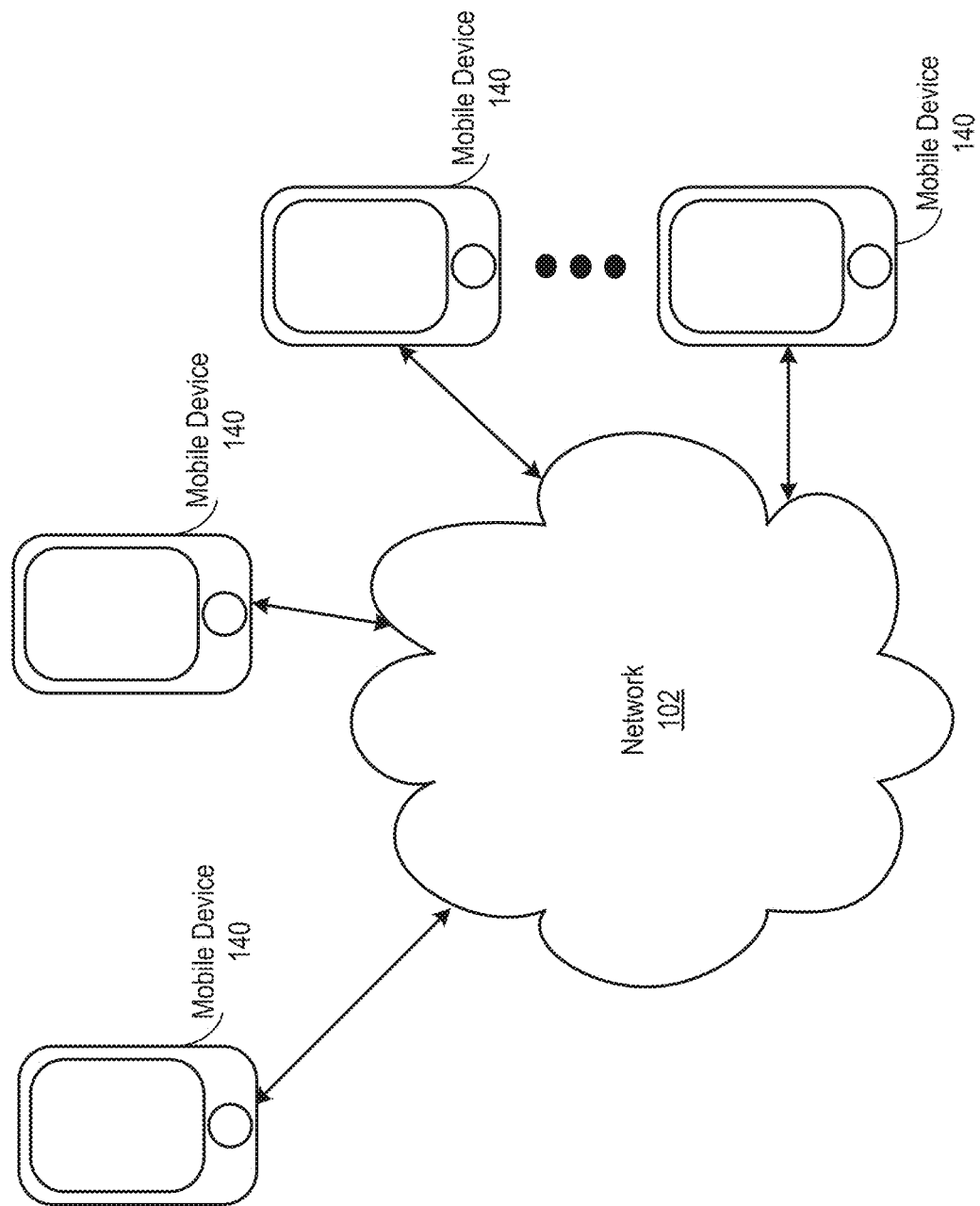
FIG. 1 is a schematic block diagram of a system in accordance with various embodiments.

FIG. 1 is a schematic block diagram of a system that includes a plurality of communication devices, such as mobile devices 140 that are connected via a network 102. The network 102 can include one or more wireless and/or wire lined communication systems; one or more private intranet systems and/or public internet systems; one or more local area networks (LAN) and/or wide area networks (WAN); and/or the Internet as well as other devices such as web servers, communication servers, social media servers and/or other network devices, edge devices and network-connected devices for facilitating any of the communication activities that will be described.

Each mobile device 140 can include a cellphone, a smartwatch, a connected car or other vehicle, a smartphone, a tablet, a personal computer, a laptop, and/or other communication device. Users can interact with their respective mobile device 140 by entering input via a touchscreen, computer mouse, keyboard, buttons, microphone and speaker, touchpad, etc., associated with the device, and can view notifications, menu options and/or other interactive interface features via a touchscreen, monitor, or display device associated with the device.

Figure 2:
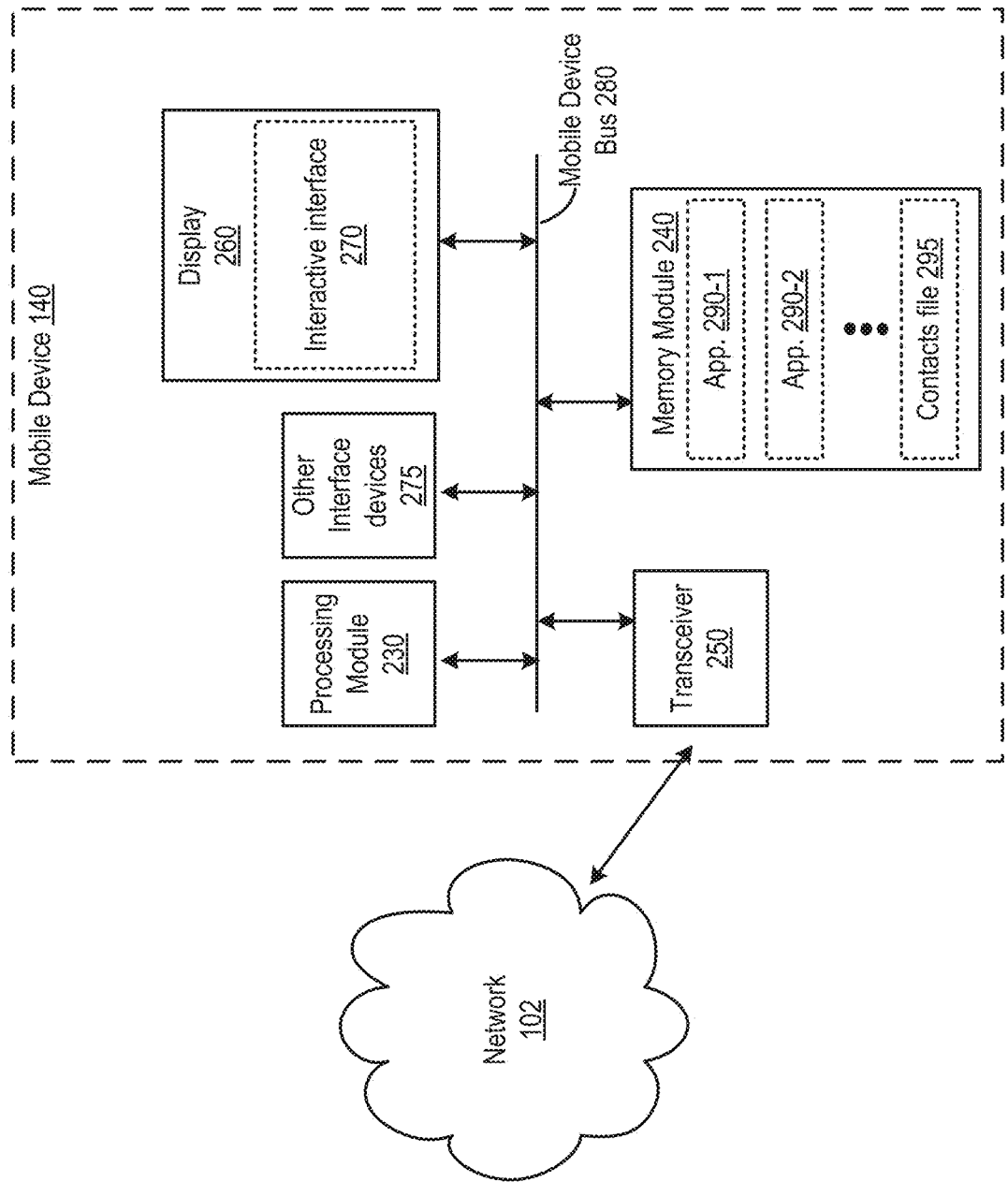
FIG. 2 is a schematic block diagram of a communication device in accordance with various embodiments.

FIG. 2 is a schematic block diagram of mobile device 140 of FIG. 1. Mobile device 140 includes a processing module 230, a memory module 240, a transceiver 250, and a display 260 which can be implemented via an interactive touch screen or other display device, which can display an interactive interface 270 that operates under control of the touchscreen and/or any of the other interface devices 275. In particular, the touchscreen and/or other interface devices 275 generate inputs or otherwise permit the user to interact with the interactive interface 270 in the form of text that is added, deleted, or edited, the creation of or interaction with other media input, the facilitation of user selections of commands, links or other interface features, and/or other interactions with the user interface 270.

The memory module 240 stores a contacts file 295 that includes contacts information corresponding to a plurality of contacts associated with a user of the mobile communication device. The contacts can include, for example, a contact name, address, various telephone numbers, email addresses, social media IDs, messaging IDs, and/or other information that can be used to designate and communicate with the a person or other entity via one or more communication services.

The processing module 230 can be implemented via a processing circuit or other processing device and can operate to execute operational instructions stored in the memory module 240. The operational instructions can include an operating system, any of a plurality of applications (apps) 290-1, 290-2, . . . , such as a messaging app, an email app, a contacts app, a voice calling app, a video calling app, a social media app, a teleconferencing app, and/or other apps of the mobile device 140 that are either prestored or downloaded in response to user selection or command. In various embodiments, the messaging app allows a user to receive, compose, and review instant messages, short message service (SMS) messages, and other chat messages, including any attachments. The email app allows a user to receive, compose, and review email messages, including any attachments. The voice calling app and video calling app allow a user to receive and send voice call including cellular or voice-over-Internet protocol (VOIP) calls, receive and send video calls, review voicemail or videomail messages, engage in conference calls, review media, etc. The social media app can facilitate user interaction with a social media platform including the composition, tagging, sending, receiving and viewing of posts, comments, likes, replies and other communications. The teleconferencing app can facilitate user interaction with a teleconferencing platform via chat, voice calling, video calling, media sharing and communications.

In addition, one or more of the communication modes mentioned above may be implemented via a single app, various dedicated applications, and/or via multiple applications include standard mobile phone communications apps, supplementary messaging apps, VOIP communication apps, video communication apps, teleconferencing apps, collaboration apps with communication features, and/or social media app that, for example, includes a list of friends, favorites and/or other contacts. In various embodiments, any of the apps 290-1, 290-2, . . . can access a separate contacts app that services one or more modes of communication and/or have a dedicated contact file that services the application itself.

The transceiver 250 is configured to communicate data, voice, text, video and/or other media via network 102. The transceiver 250 can be implemented via a wireless local area network transceiver, a cellular data transceiver or other wired or wireless transceiver capable of communication with a network such as network 102. The components of mobile device 140 are connected via mobile device bus 280. While a particular bus configuration is shown for the purposes of illustration, the mobile device 140 can otherwise include one or more additional buses and/or direct connectivity between functional blocks. Furthermore, one skilled in the art will recognize that the mobile device 140 can include other elements not specifically shown.

In an example of the operation, a mobile communication device such as mobile device 140, stores operational instructions in the memory module 240. The operational instructions, when executed by the processing module 230, cause the processing module 230 to perform operations that include:

- generating an interactive interface 270 that is presented for display via the display device 260;
- receiving reminder data via user interaction with the interactive interface 270, wherein the reminder data indicates a reminder associated with one of the plurality of contacts, the reminder data can be stored in the contacts file 295 or elsewhere in the memory module 240.
- receiving communication event data in response to a communications event associated a communication with the one of the plurality of contacts via the network 102;
- generating, in response to the communication event, a notification that includes the reminder data; and
- presenting for display, via the interactive interface 270, the notification.

Examples of communication events include: initiation of a video call by the mobile communication device to one of the plurality of contacts; initiation of a voice call by the mobile communication device to one of the plurality of contacts; initiation of an email message by the mobile communication device to one of the plurality of contacts, initiation of a social media post to one of the plurality of contacts including composition of a post, tagging one of the plurality of contacts, sending a post to one of the plurality of contacts, commenting on a post of one of the plurality of contacts, liking a post of one of the plurality of contacts, and/or replying to a post, comment, like or reply by one of the plurality of contacts; and/or initiation of a chat message by the mobile communication device to one of the plurality of contacts. Further examples of communication events include: reception of a video call by the mobile communication device from one of the plurality of contacts; reception of a voice call by the mobile communication device from one of the plurality of contacts; reception of an email message by the mobile communication device from one of the plurality of contacts; reception of a chat message by the mobile communication device from one of the plurality of contacts, reception of a social media post from one of the plurality of contacts including viewing the post and/or being tagged in a post, being tagged in comments by one of the plurality of contacts, or in being mentioned or tagged in replies by one of the plurality of contacts. Other communication events associated with a contact can be likewise used to trigger reminders associated with that particular contact.

When the communication event includes initiation of a message by the mobile device 140 to one of the plurality of contacts, the operations of the mobile device 140 can further include:

- retrieving the reminder data;
- automatically drafting the message, based on the reminder data;
- generating revisions to the message in response to user interactions with the interactive interface;
- generating a revised message based on the revisions to the message;
- sending the draft message or the revised message to the one of the plurality of contacts via the transceiver 250 and the network 102;
- cancelling the reminder in response to a completion of the communication event, e.g. the transmission of the draft or revised message; and/or
- cancelling the reminder in response to user interaction with the interactive interface 270 indicating cancellation of the reminder.

When the communication event includes reception of a message by the mobile device 140 to the one of the plurality of contacts, and wherein the operations further include:

- retrieving the reminder data; and
- automatically drafting a reply message, based on the reminder data.
- generating revisions to the reply message in response to user interactions with the interactive interface;
- generating a revised reply message based on the revisions to the reply message;
- sending either the reply message or the revised reply message to the one of the plurality of contacts via the transceiver 250 and network 102;
- cancelling the reminder in response to a completion of the communication event, e.g. the transmission of the reply or revised reply message; and/or
- cancelling the reminder in response to user interaction with the interactive interface 270 indicating cancellation of the reminder.

In various embodiments, the operations of the mobile device 140 further include:

- selecting one or more additional contacts in response to user interactions with the interactive interface; and
- associating the reminder data with the one or more additional contacts.

In this fashion, a single reminder can be copied and set for multiple different contacts.

The foregoing method and systems improve the technology of automated reminders, by triggering reminder notifications based on communication events associated with the contact that is the subject of the reminder. Furthermore, reminder messages can automatically be generated based on the processing of reminder text and/or reminder notifications can be automatically cancelled when a communication event is concluded. The further operation of the mobile device 140, including many optional functions and features, is described in conjunction with FIGS. 3A-3B, 4A-4G, 5A-5B and 6 that follow.

Figure 3A:
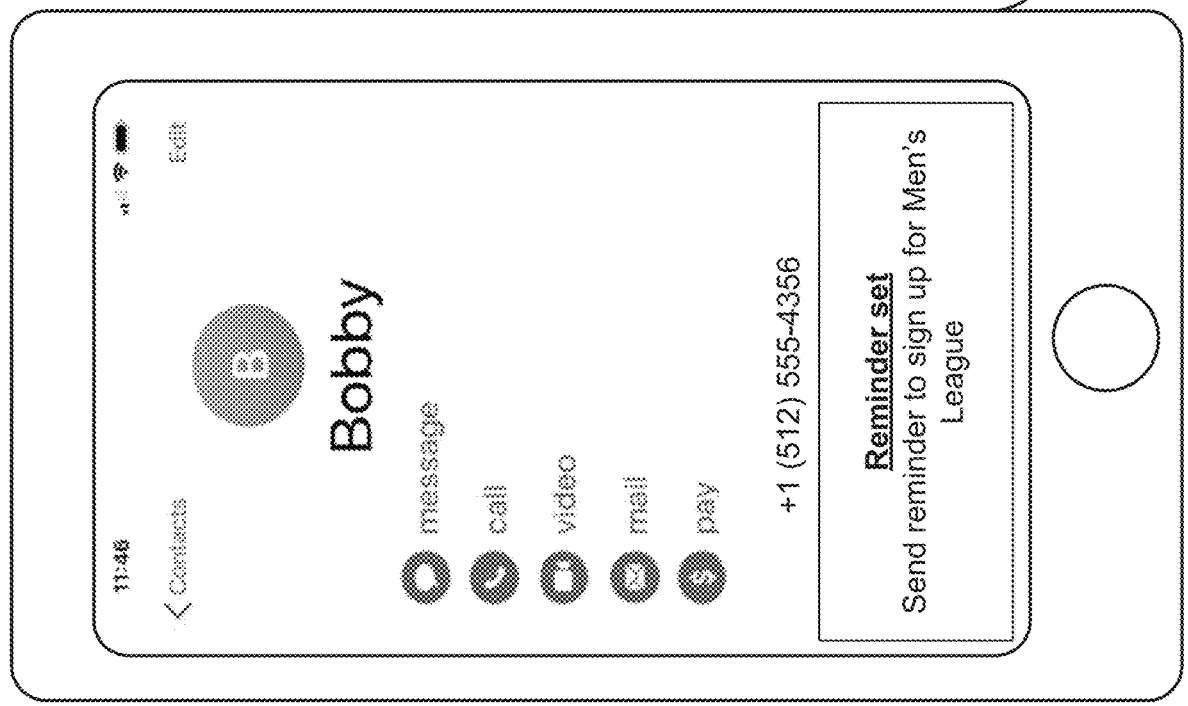
FIGS. 3A and 3B illustrate screen displays of a mobile communication device in accordance with various embodiments.
Figure 3B:
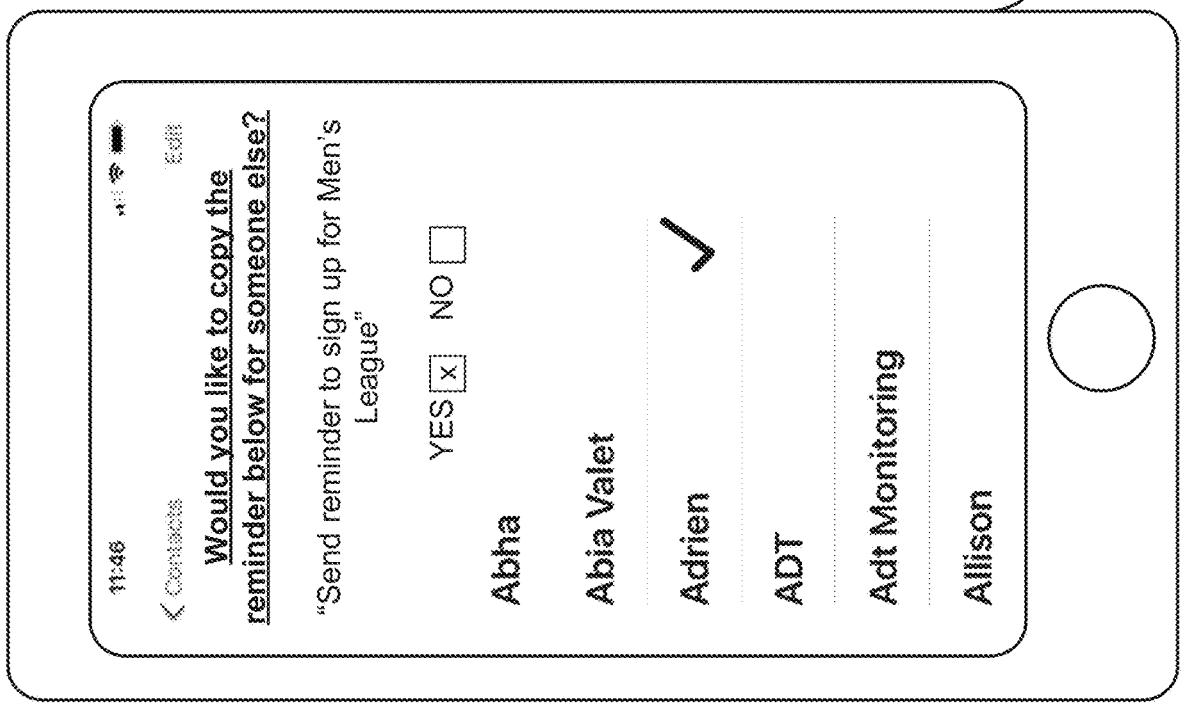

FIGS. 3A and 3B illustrate screen displays of a mobile communication device in accordance with various embodiments. In particular, a mobile device 140-Jose is presented that is associated with a particular user "Jose" that is friends with "Bobby". Turning to FIG. 3A, an example entry in Jose's contact file for Bobby is presented via the interactive interface 270 of the mobile device 140-Jose. In this example, Jose has created, via interaction with the interactive interface

270, a reminder associated with Bobby. The text of the reminder indicates, "Send reminder to sign up for Men's League".

Turning to FIG. 3B, Jose has selected, via interactive interface 270, to copy this reminder and associate it with another of his contacts. A list of contacts is presented and Jose has selected to also set the reminder for another contact, Adrien.

Figure 4A:
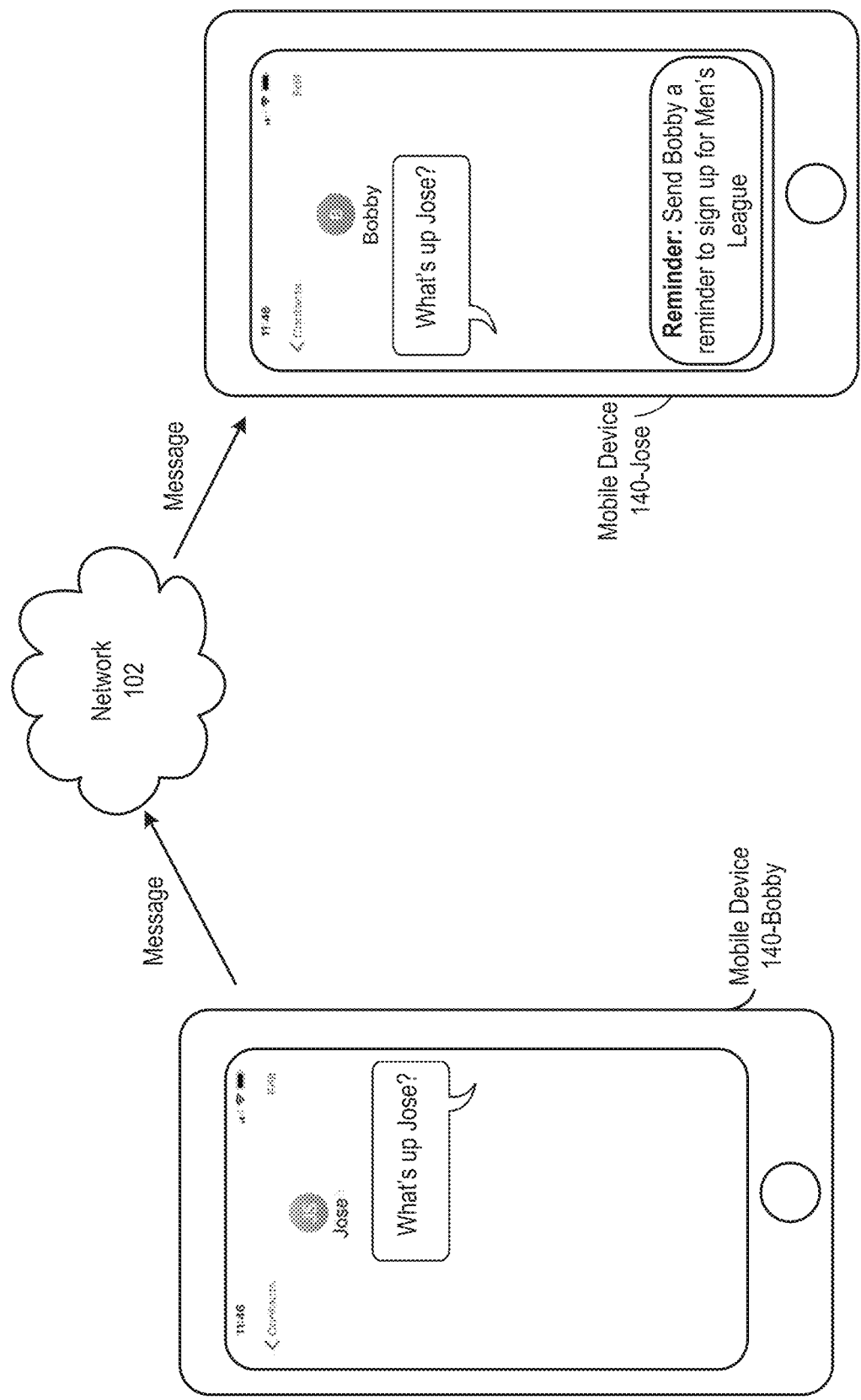

FIGS. 4A-4G illustrate screen displays of mobile communication devices in accordance with various embodiments. In addition to showing Jose's mobile device 140, Bobby's mobile device 140 (designated 140-Bobby) is also presented. Turning to FIG. 4A, Bobby has composed and sent a text message to Jose via network 102. In response to receiving the text message, the interactive interface 275 of Jose's mobile device presents not only the message from Bobby, but automatically triggers a message notification such as a pop-up message or other notification reminding Jose of the substance of the reminder he previously set for Bobby. The text of the reminder is displayed via the interactive interface.

Figure 4B:
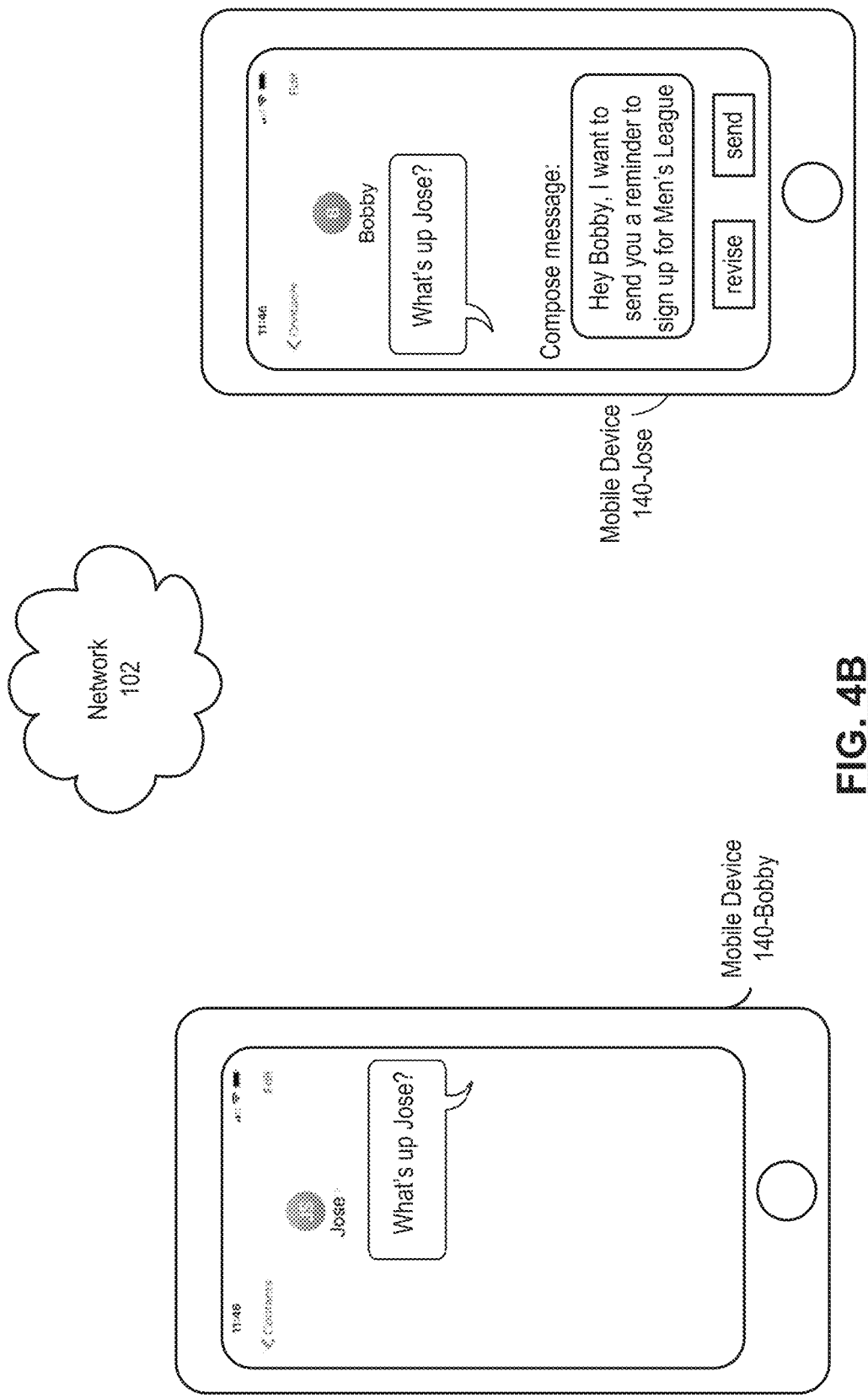
Figure 4C:
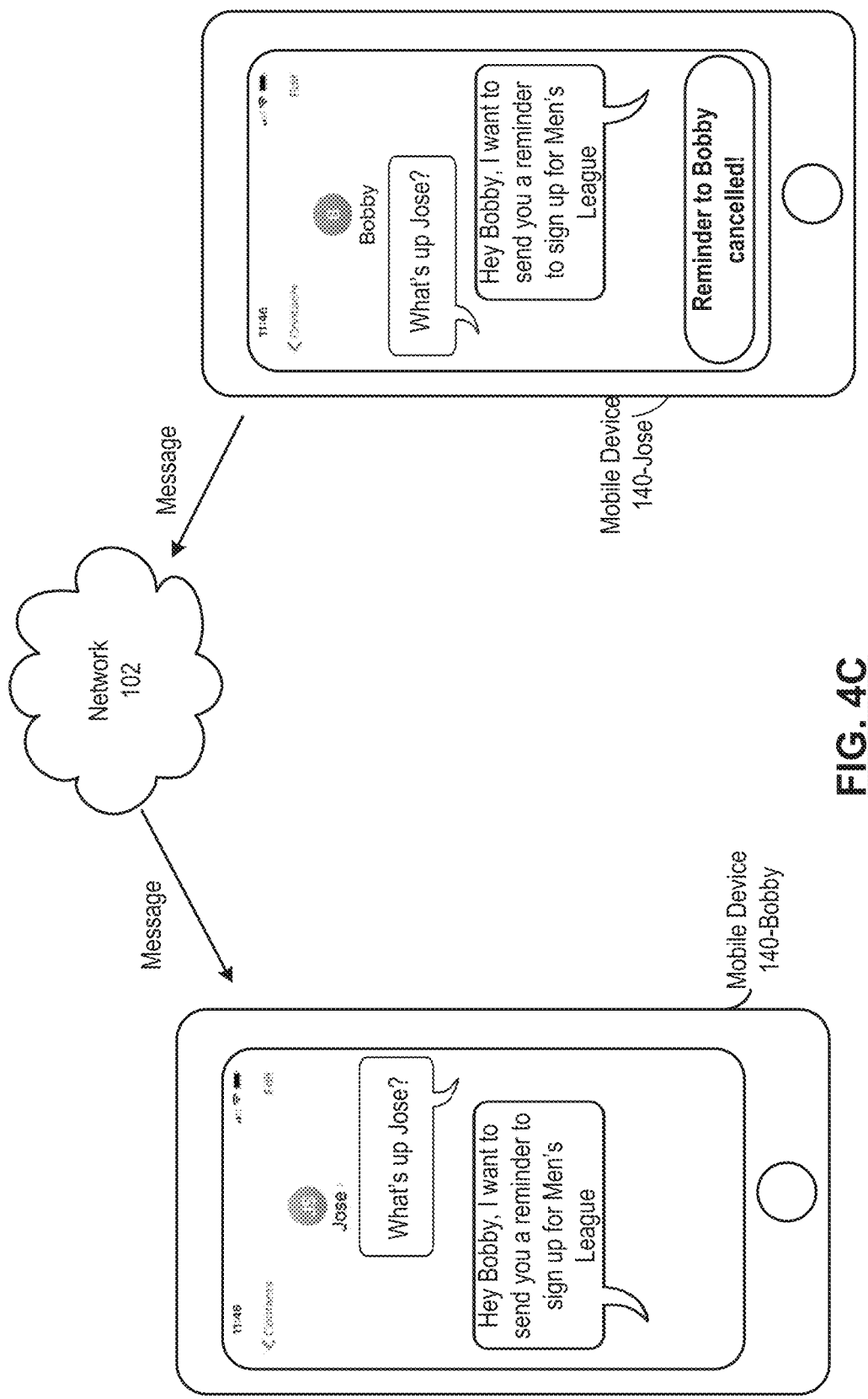

Turning to FIG. 4B, the Jose's mobile device, 140-Jose, has automatically composed a message, based on the text of the reminder. In the example shown, natural language processing, rule-based techniques or other artificial intelligence processing have been used to convert the reminder, "Send Bobby a reminder to sign up for Men's League" to "Hey Bobby, I want to send you a reminder to sign up for Men's League". Jose is given the opportunity to revise the automatically generated reply message or to send it as-is. Turning to FIG. 4C, the reply message has been sent to Bobby as-is. In response to the transmission of the message, an indication that the message was successfully received by Bobby and/or an indication that the message was read by Bobby, the reminder to Bobby has been automatically cancelled—without any further user intervention by Jose. The cancellation of the reminder is indicated by a notification, such as the pop-up message shown.

Figure 4D:
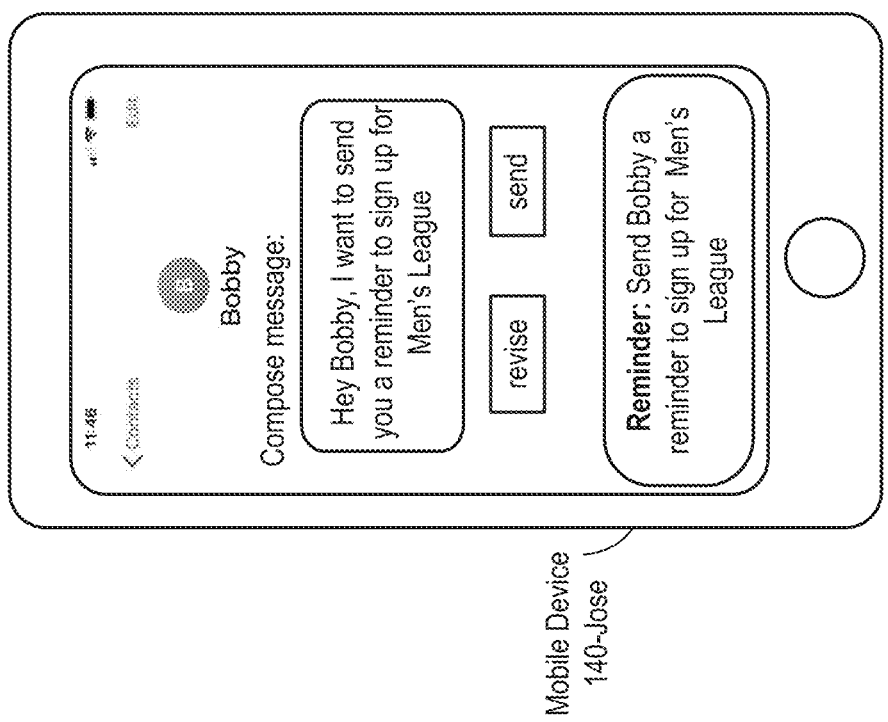
Figure 4E:
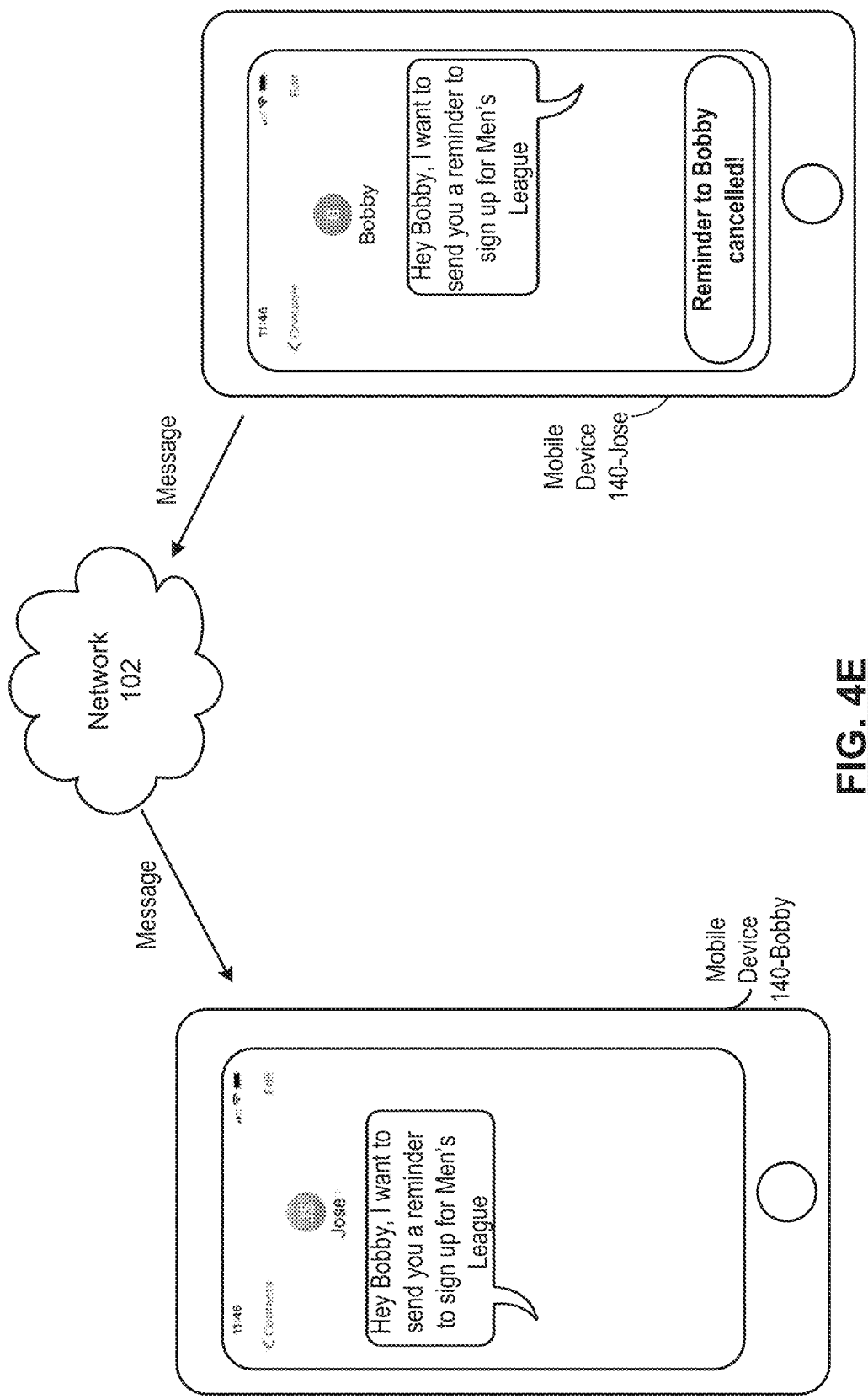

Turning now to FIG. 4D, an alternative scenario is presented that begins with the initiation of a message from Jose to Bobby. When Jose selects Bobby from his contacts and begins to compose the message, a pop-up reminder appears with the reminder text. An automatically generated message is also presented via the interactive interface which Bobby can revise or send as-is. Turning to FIG. 4E, the message has been sent to Bobby as-is. In response to the transmission of the message, an indication that the message was successfully received by Bobby or an indication that the message was read by Bobby, the reminder to Bobby can be automatically cancelled, without any further user intervention by Jose, as indicated by the pop-up notification.

Figure 4F:
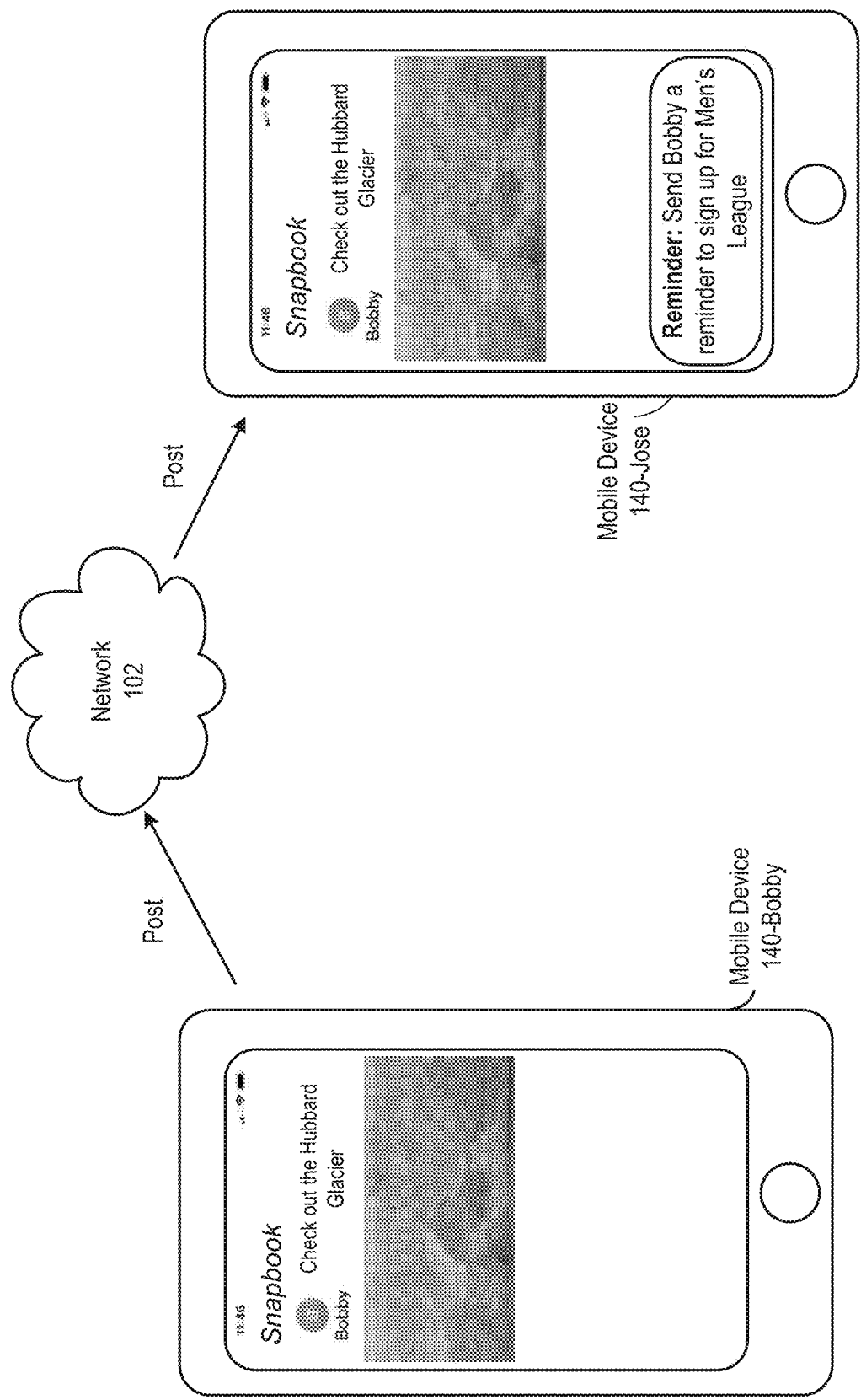

While FIGS. 4A-4E have focused on reminders triggered by communication events involving text messaging, as previously discussed, other communication events can also be used to trigger the reminders disclosed herein. Turning now to FIG. 4F, Bobby has generated a post regarding the Hubbard Glacier on a hypothetical social media platform, "Snapbook". In response to Jose's viewing of the post, the interactive interface 275 of Jose's mobile device automatically triggers a pop-up message notification reminding Jose of the reminder he previously set for Bobby. The text of the reminder is displayed via the interactive interface.

Turning to FIG. 4G, a reply to Bobby's post has been posted. In response to the posting of the reply, an indication that the reply was received or read by Bobby, the reminder to Bobby has been automatically cancelled, without any further user intervention by Jose, as indicated by the pop-up notification. While FIGS. 4F-4G present communication events triggered by social media posts received by a particular user (Jose), similarly the initiation of a social media post by Jose that tags Bobby or is otherwise directed to Bobby, could also be used to trigger the reminders.

FIGS. 5A and 5B illustrate reminder data to message conversion in accordance with various embodiments. As previously discussed, draft messages that are based on the content of a reminder can automatically be generated and displayed by the mobile device 140. In the example shown in FIG. 5A, natural language processing, rule-based techniques and/or other artificial intelligence (AI) processing have been used to convert the reminder, "Send Bobby a reminder to sign up for Men's League" to "Hey Bobby, I want to send you a reminder to sign up for Men's League".

In operation, the processing begins by isolating the proper noun "Bobby" from the remaining portions of the message. The term "Bobby" is used to generate the salutation and intro "Hey Bobby, I want to" which is appended to the start of the draft message. The term "Bobby is also subjected to a proper noun to pronoun conversion to generate "you" that is inserted in the same location within the remaining portions of the reminder text.

In the example shown in FIG. 5B, natural language processing, rule-based techniques and/or other artificial intelligence processing have been used to convert the reminder, "Ask if he is up for golf this weekend" to "Hey Bobby, I want to ask if you are up for golf this weekend". In operation, the processing begins by extracting the name "Bobby" from the contact of contacts file associated with the reminder. This is used to generate the salutation and intro "Hey Bobby, I want to" which is appended to the start of the draft message. The pronoun perspective is also modified from "he is" to "you are" that is inserted in the same location within the remaining portions of the reminder text.

It should be noted that while particular examples are presented above, other AI processing and other techniques can likewise be used to automatically generate draft message text from the text of a reminder.

FIG. 6 is a flowchart representation of a method in accordance with various embodiments. In particular a method is presented for use in conjunction with any of the functions and features previously described. Step 502 includes generating an interactive interface that is presented for display via a display device associated with a mobile communication device. Step 504 includes receiving reminder data via user interaction with the interactive interface, wherein the reminder data indicates a reminder associated with one of a plurality of contacts. Step 506 includes receiving communication event data in response to a communications event associated a communication, via the mobile communication device, with the one of the plurality of contacts. Step 508 includes generating, in response to the communication event, a notification that includes the reminder data. Step 510 includes presenting for display, via the interactive interface, the notification.

In various embodiments, the communication events include: initiation of a video call by the mobile communication device to the one of the plurality of contacts; initiation of a voice call by the mobile communication device to the one of the plurality of contacts; initiation of an email message by the mobile communication device to the one of the plurality of contacts; initiation of a social media communication by the mobile communication device to the one of the plurality of contacts; and/or initiation of a chat message by the mobile communication device to the one of the plurality of contacts. Further examples of communication events include: reception of a video call by the mobile communication device from the one of the plurality of contacts; reception of a voice call by the mobile communication device from the one of the plurality of contacts; reception of an email message by the mobile communication device from the one of the plurality of contacts; reception of a chat message by the mobile communication device from the one of the plurality of contacts, or reception of a social media post from the one of the plurality of contacts. Other communication events associated with a contact can be likewise used to trigger reminders associated with that particular contact.

When the communication event includes initiation of a message by the mobile communication device to the one of the plurality of contacts, the method can further include:
retrieving the reminder data;
automatically drafting the message, based on the reminder data;
generating revisions to the message in response to user interactions with the interactive interface;
generating a revised message based on the revisions to the message;
sending the draft message or the revised message to the one of the plurality of contacts over a network via a transceiver;
cancelling the reminder in response to a completion of the communication event, e.g. the transmission of the draft or revised message; and/or
cancelling the reminder in response to user interaction with the interactive interface indicating cancellation of the reminder.

When the communication event includes reception of a message by the mobile communication device to the one of the plurality of contacts, the method can further include:
retrieving the reminder data; and
automatically drafting a reply message, based on the reminder data.
generating revisions to the reply message in response to user interactions with the interactive interface;
generating a revised reply message based on the revisions to the reply message;
sending either the reply message or the revised reply message to the one of the plurality of contacts via the transceiver 250 and network 102;
cancelling the reminder in response to a completion of the communication event, e.g. the transmission of the reply or revised reply message; and/or
cancelling the reminder in response to user interaction with the interactive interface indicating cancellation of the reminder.

In various embodiments, the method further includes:
selecting one or more additional contacts in response to user interactions with the interactive interface; and
associating the reminder data with the one or more additional contacts.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A mobile communication device comprising:
    a transceiver configured to communicate via a network;
    a display device;
    a processing module that includes at least one processing circuit;
    a memory module configured to store a contacts file, the contacts file including contacts information corresponding to a plurality of contacts associated with a user of the mobile communication device and that is further configured to store operational instructions that, when executed by the processing module, cause the processing module to perform operations that include:
        generating an interactive interface that is presented for display via the display device;
        receiving reminder data via user interaction with the interactive interface, wherein the reminder data indicates a reminder associated with one of the plurality of contacts;
        receiving communication event data in response to a communications event associated with a communication with the one of the plurality of contacts via the network;
        retrieving the reminder data;
        generating, in response to the communication event, a notification that includes the reminder data;
        automatically drafting, based on the reminder data, a message including a salutation generated from a proper noun isolated from a contact file associated with the reminder, and other message content generated based on a pronoun conversion of portions of reminder text, wherein the pronoun conversion of the portions of the reminder text converts the proper noun isolated from the contact file to a pronoun in the portions of the reminder text and further includes a modification of a pronoun perspective in the portions of the reminder text including conversion of a first pronoun in a first perspective to a second pronoun in a second perspective;
        presenting for display, via the interactive interface, the notification and the message; and
        automatically displaying an indication the reminder has been cancelled in response to a completion of the communication event.

2. The mobile communication device of claim 1, wherein the communication event includes initiation of a social media communication by the mobile communication device to the one of the plurality of contacts that includes the message.

3. The mobile communication device of claim 1, wherein the communication event includes reception of a social media post from the one of the plurality of contacts, wherein the message is a reply to the social media post.

4. The mobile communication device of claim 1, wherein the operations further include:
    cancelling the reminder in response to user interaction with the interactive interface indicating cancellation of the reminder.

5. The mobile communication device of claim 1, wherein the operations further include:
    generating revisions to the message in response to user interactions with the interactive interface;
    generating a revised message based on the revisions to the message; and
    sending the revised message to the one of the plurality of contacts via the network.

6. The mobile communication device of claim 1, wherein the communication event includes reception of communication by the mobile communication device from the one of the plurality of contacts, and wherein the message is a reply message.

7. The mobile communication device of claim 6, wherein the operations further include:
    generating revisions to the reply message in response to user interactions with the interactive interface;
    generating a revised reply message based on the revisions to the reply message; and
    sending the revised reply message to the one of the plurality of contacts via the network.

8. The mobile communication device of claim 1, wherein the operations further include:
    selecting one or more additional contacts in response to user interactions with the interactive interface; and
    associating the reminder data with the one or more additional contacts.

9. A method for use with a mobile communication device that includes a processing circuit and that is configured to communicate via a network, the method comprising:
    generating an interactive interface that is presented for display via a display device associated with the mobile communication device;
    receiving reminder data via user interaction with the interactive interface, wherein the reminder data indicates a reminder associated with one of a plurality of contacts;
    receiving communication event data in response to a communications event associated with a communication, via the mobile communication device, with the one of the plurality of contacts;
    retrieving the reminder data;
    generating, in response to the communication event, a notification that includes the reminder data;
    automatically drafting, based on the reminder data, a message including a salutation generated from a proper noun isolated from a contact file associated with the reminder, and other message content generated based on a pronoun conversion of portions of reminder text, wherein the pronoun conversion of the portions of the reminder text converts the proper noun isolated from the contact file to a pronoun in the portions of the reminder text and further includes a modification of a pronoun perspective in the portions of the reminder text including conversion of a first pronoun in a first perspective to a second pronoun in a second perspective;

presenting for display, via the interactive interface, the notification and the message; and automatically displaying an indication the reminder has been cancelled in response to a completion of the communication event.

10. The method of claim 9, wherein the communication event includes initiation of a social media communication by the mobile communication device to the one of the plurality of contacts that includes the message.

11. The method of claim 9, wherein the communication event includes reception of a social media post from the one of the plurality of contacts, wherein the message is a reply to the social media post.

12. The method of claim 9, further comprising:

cancelling the reminder in response to user interaction with the interactive interface indicating cancellation of the reminder.

13. The method of claim 9, further comprising:

generating revisions to the message in response to user interactions with the interactive interface;

generating a revised message based on the revisions to the message; and sending the revised message to the one of the plurality of contacts via the network.

14. The method of claim 9, wherein the communication event includes reception of communication by the mobile communication device from the one of the plurality of contacts, and wherein the message is a reply message.

15. The method of claim 14, further comprising:

generating revisions to the reply message in response to user interactions with the interactive interface;

generating a revised reply message based on the revisions to the reply message; and sending the revised reply message to the one of the plurality of contacts via the network.

16. The method of claim 9, further comprising:

selecting one or more additional contacts in response to user interactions with the interactive interface; and associating the reminder data with the one or more additional contacts.

* * * * *